(12) United States Patent
MacAndrew et al.

(10) Patent No.: US 11,874,945 B2
(45) Date of Patent: Jan. 16, 2024

(54) METHOD AND SYSTEM FOR FILTERING DATABASE QUERIES

(71) Applicant: JPMorgan Chase Bank, N.A., New York, NY (US)

(72) Inventors: Robert MacAndrew, Glasgow (GB); Miklos Kalman, Glasgow (GB); Joel Klein, Croton, NY (US)

(73) Assignee: JPMORGAN CHASE BANK, N.A., New York, NY (US)

(*) Notice: Subject to any disclaimer, the term of this patent is extended or adjusted under 35 U.S.C. 154(b) by 613 days.

(21) Appl. No.: 16/929,547

(22) Filed: Jul. 15, 2020

(65) Prior Publication Data

US 2022/0019684 A1 Jan. 20, 2022

(51) Int. Cl.

| | | |
|---|---|---|
| G06F 21/62 | (2013.01) | |
| G06F 21/31 | (2013.01) | |
| G06F 16/242 | (2019.01) | |
| G06F 9/54 | (2006.01) | |
| G06N 20/00 | (2019.01) | |
| G06F 16/2455 | (2019.01) | |

(52) U.S. Cl.
CPC .......... *G06F 21/6227* (2013.01); *G06F 9/542* (2013.01); *G06F 16/2443* (2019.01); *G06F 16/24564* (2019.01); *G06F 21/31* (2013.01); *G06N 20/00* (2019.01)

(58) Field of Classification Search
CPC ........ G06F 21/31; G06F 21/566; G06F 21/62; G06F 21/6218; G06F 21/6227; G06F 16/2433; G06F 16/24564; G06F 9/542; H04L 63/0227; H04L 63/0263; G06N 20/00
See application file for complete search history.

(56) References Cited

U.S. PATENT DOCUMENTS

| | | | |
|---|---|---|---|
| 2017/0318027 A1* | 11/2017 | Rodniansky | ........ H04L 63/1425 |
| 2018/0114033 A1* | 4/2018 | Mathur | ............... G06F 21/6227 |
| 2019/0220607 A1* | 7/2019 | Dodor | ..................... G06F 16/27 |
| 2019/0354712 A1* | 11/2019 | Rodniansky | .......... H04L 63/205 |
| 2020/0042647 A1* | 2/2020 | Pandey | ................. G06F 16/951 |
| 2021/0165899 A1* | 6/2021 | Joshipura | ................ G06F 21/31 |

* cited by examiner

*Primary Examiner* — Jeffrey C Pwu
*Assistant Examiner* — Paul J Skwierawski
(74) *Attorney, Agent, or Firm* — GREENBLUM & BERNSTEIN, P.L.C.

(57) ABSTRACT

A method and a system for dynamically scanning, filtering, and blocking harmful database queries that would otherwise consume significant resources and adversely impact overall system performance are provided. The method includes: receiving a user request for data from a database, the first request including a query; applying database access rules to the query in order to determine whether the query is potentially harmful; when the query is determined as not potentially harmful, forwarding the request to a server configured to respond to the request; and when the first query is determined as being potentially harmful, transmitting a warning message to the user. The database access rules may include a maximum memory consumption rule and a maximum CPU consumption rule. Machine learning techniques are used for adjusting the database access rules based on historical data.

18 Claims, 7 Drawing Sheets

FIG. 6

METHOD AND SYSTEM FOR FILTERING DATABASE QUERIES

BACKGROUND

1. Field of the Disclosure

This technology generally relates to methods and systems for providing a gatekeeper function with respect to a database, and more particularly, to methods and systems for dynamically scanning, filtering, and blocking harmful database queries that would otherwise consume significant resources and adversely impact overall system performance.

2. Background Information

For most applications, there is a need to access data from a data repository, such as a memory, a database, or a data warehouse or data store that includes many component databases. In some instances, the amount of data stored in such a data store may be very large, and the number of applications and/or users that may require access to the data store may also be relatively large.

When an application and/or a user needs to access data that is available in a data store, an access request may be effected by the submission of a query that specifies the desired data. However, responding to such a query may result in a large amount of data, thereby consuming a correspondingly large amount of resources and potentially causing an adverse impact to system performance. In some situations, when the response to such a query is sufficiently large, a system interruption and/or temporary shutdown may occur.

For many systems, a conventional approach to handling a query that may be harmful to system performance has been to proactively monitor the data store and to kill the query when it is determined that a threshold amount of resources have been consumed. However, such an approach is reactive to a problem that has already become manifested.

Accordingly, there is a need for a method for dynamically scanning, filtering, and blocking harmful database queries before such queries begin to consume significant resources and to cause adverse system performance impacts.

SUMMARY

The present disclosure, through one or more of its various aspects, embodiments, and/or specific features or sub-components, provides, inter alia, various systems, servers, devices, methods, media, programs, and platforms for dynamically scanning, filtering, and blocking harmful database queries that would otherwise consume significant resources and adversely impact overall system performance.

According to an aspect of the present disclosure, a method for controlling access to a database is provided. The method is implemented by at least one processor. The method includes: receiving, from a user by the at least one processor, a first request for data that is accessible via a database, the first request including a first query; analyzing, by the at least one processor, the first query to determine whether the first query is potentially harmful; when the first query is determined as not potentially harmful, forwarding, by the at least one processor, the first request to a server configured to respond to the first request; and when the first query is determined as being potentially harmful, transmitting, to the user by the at least one processor, a warning message.

The analyzing may include applying at least one database access rule to the first query.

The at least one database access rule may include at least one from among a rule that relates to a maximum amount of memory to be consumed by granting the first request and a rule that relates to a maximum amount of central processing unit (CPU) resources to be consumed by granting the first request.

The method may further include storing a result of the analyzing in a historical database access data repository.

The analyzing may further include using at least one machine learning technique for determining whether the first query is potentially harmful.

The use of at least one machine learning technique may include using the first query and data stored in the historical database access data repository as inputs to a predetermined machine learning algorithm and determining whether the first query is potentially harmful based on an output of the predetermined machine learning algorithm.

The use of at least one machine learning technique may include: using the data stored in the historical database access data repository as an input to a predetermined machine learning algorithm; modifying the at least one database access rule based on an output of the predetermined machine learning algorithm; and determining whether the first query is potentially harmful based on the modified at least one database access rule.

The warning message may include information indicating that the first request is denied and that the first query is not to be executed, in conjunction with explanatory information indicating a reason for the denial of the first request.

Alternatively, the warning message may include explanatory information indicating a reason for the warning message and a user reply request for prompting the user to provide at least one from among a second request that includes a second query and a third request that includes a user instruction to override the warning message and to grant the first request.

The first query may include a Structured Query Language (SQL) query.

According to another exemplary embodiment, a computing apparatus for controlling access to a database is provided. The computing apparatus includes a processor, a memory, and a communication interface coupled to each of the processor and the memory. The processor is configured to: receive, from a user via the communication interface, a first request for data that is accessible via a database, the first request including a first query; analyze the first query to determine whether the first query is potentially harmful; when the first query is determined as not potentially harmful, forward, via the communication interface, the first request to a server configured to respond to the first request; and when the first query is determined as being potentially harmful, transmit, to the user via the communication interface, a warning message.

The processor may be further configured to analyze the first query by applying at least one database access rule to the first query.

The at least one database access rule may include at least one from among a rule that relates to a maximum amount of memory to be consumed by granting the first request and a rule that relates to a maximum amount of central processing unit (CPU) resources to be consumed by granting the first request.

The processor may be further configured to store a result of the analysis in a historical database access data repository.

The processor may be further configured to analyze the first query by using at least one machine learning technique for determining whether the first query is potentially harmful.

The processor may be further configured to use the first query and data stored in the historical database access data repository as inputs to a predetermined machine learning algorithm and to determine whether the first query is potentially harmful based on an output of the predetermined machine learning algorithm.

The processor may be further configured to: use the data stored in the historical database access data repository as an input to a predetermined machine learning algorithm; modify the at least one database access rule based on an output of the predetermined machine learning algorithm; and determine whether the first query is potentially harmful based on the modified at least one database access rule.

The warning message may include information indicating that the first request is denied and that the first query is not to be executed, in conjunction with explanatory information indicating a reason for the denial of the first request.

Alternatively, the warning message may include explanatory information indicating a reason for the warning message and a user reply request for prompting the user to provide at least one from among a second request that includes a second query and a third request that includes a user instruction to override the warning message and to grant the first request.

The first query may include a Structured Query Language (SQL) query.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6 is a second screenshot that illustrates a user interface that includes an error display in a result window that is provided in response to a user request for accessing data when the SQL query has been determined to be potentially harmful, in accordance with an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
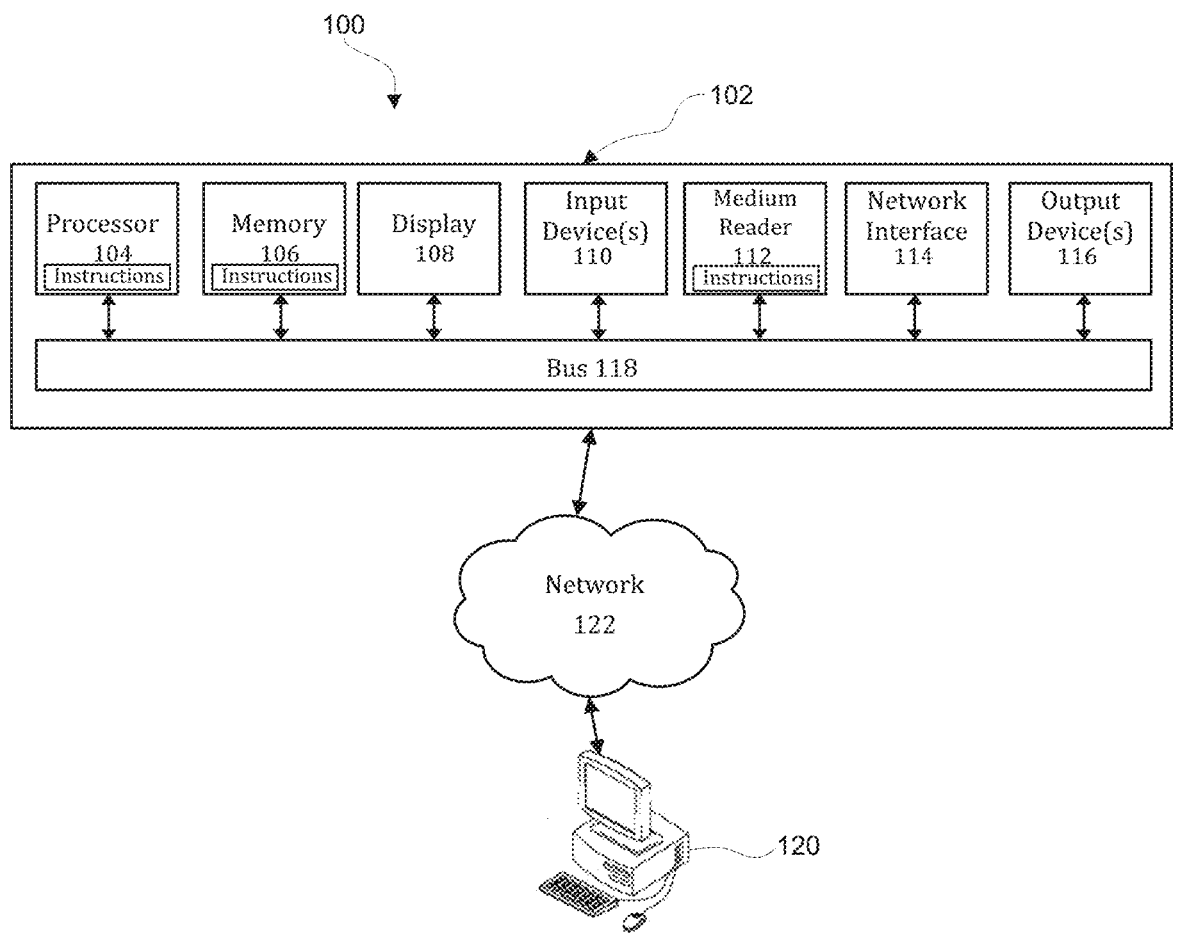
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component.

The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for dynamically scanning, filtering, and blocking harmful database queries that would otherwise consume significant resources and adversely impact overall system performance.

Figure 2:
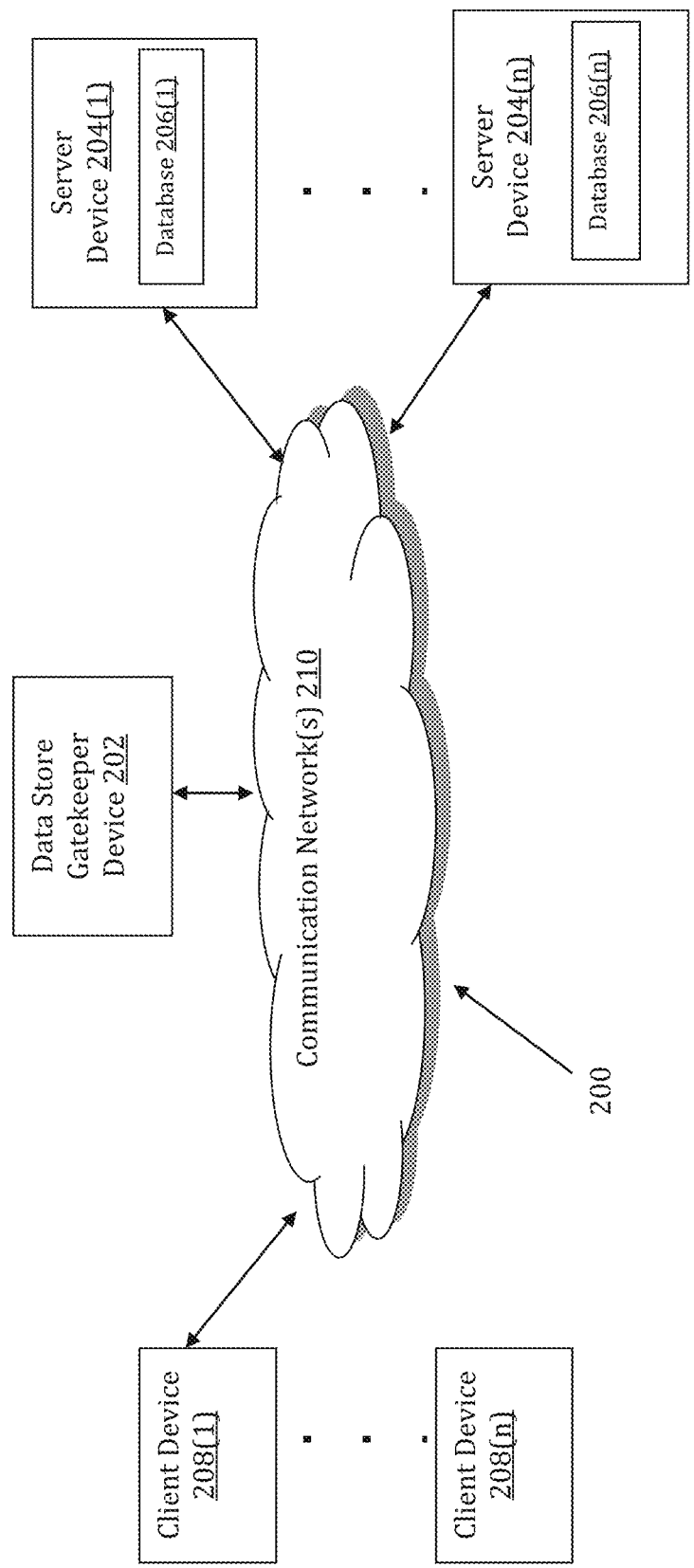
FIG. 2 illustrates an exemplary diagram of a network environment.

Referring to FIG. 2, a schematic of an exemplary network environment 200 for implementing a method for dynamically scanning, filtering, and blocking harmful database queries that would otherwise consume significant resources and adversely impact overall system performance is illustrated. In an exemplary embodiment, the method is executable on any networked computer platform, such as, for example, a personal computer (PC).

The method for dynamically scanning, filtering, and blocking harmful database queries that would otherwise consume significant resources and adversely impact overall system performance may be implemented by a Data Store Gatekeeper (DSG) device 202. The DSG device 202 may be the same or similar to the computer system 102 as described with respect to FIG. 1. The DSG device 202 may store one or more applications that can include executable instructions that, when executed by the DSG device 202, cause the DSG device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DSG device 202 itself, may be located in virtual server(s) running in a cloud-based computing environment rather than being tied to one or more specific physical network computing devices. Also, the application(s) may be running in one or more virtual machines (VMs) executing on the DSG device 202. Additionally, in one or more embodiments of this technology, virtual machine(s) running on the DSG device 202 may be managed or supervised by a hypervisor.

In the network environment 200 of FIG. 2, the DSG device 202 is coupled to a plurality of server devices 204(1)-204(n) that hosts a plurality of databases 206(1)-206(n), and also to a plurality of client devices 208(1)-208(n) via communication network(s) 210. A communication interface of the DSG device 202, such as the network interface 114 of the computer system 102 of FIG. 1, operatively couples and communicates between the DSG device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DSG device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DSG devices that efficiently implement a method for dynamically scanning, filtering, and blocking harmful database queries that would otherwise consume significant resources and adversely impact overall system performance.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DSG device 202 may be a standalone device or integrated with one or more other devices or apparatuses, such as one or more of the server devices 204(1)-204(n), for example. In one particular example, the DSG device 202 may include or be hosted by one of the server devices 204(1)-204(n), and other arrangements are also possible. Moreover, one or more of the devices of the DSG device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DSG device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) host the databases 206(1)-206(n) that are configured to store historical data store access data and data store query rules data that relates to rules for determining whether an access query would be deemed harmful.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DSG device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DSG device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DSG device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DSG device 202, the server devices 204(1)-204(n), or the client devices 208(1)-208(n), for example, may be configured to operate as virtual instances on the same physical machine. In other words, one or more of the DSG device 202, the server devices 204(1)-204(n), or the client devices 208(1)-208(n) may operate on the same physical device rather than as separate devices communicating through communication network(s) 210. Additionally, there may be more or fewer DSG devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
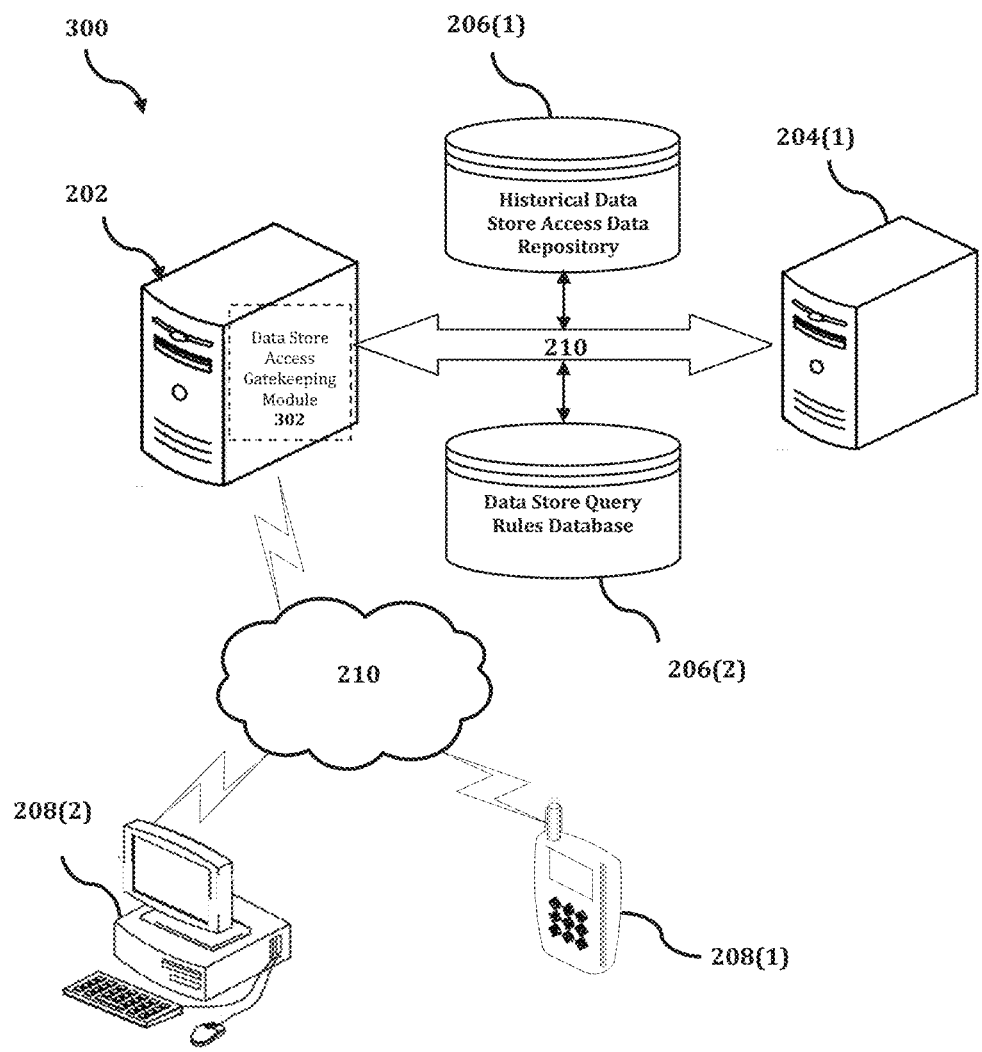
FIG. 3 shows an exemplary system for implementing a method for dynamically scanning, filtering, and blocking harmful database queries that would otherwise consume significant resources and adversely impact overall system performance.

The DSG device 202 is described and shown in FIG. 3 as including a data store access gatekeeping module 302, although it may include other rules, policies, modules, databases, or applications, for example. As will be described below, the data store access gatekeeping module 302 is configured to implement a method for dynamically scanning, filtering, and blocking harmful database queries that would otherwise consume significant resources and adversely impact overall system performance in an automated, efficient, scalable, and reliable manner.

An exemplary process 300 for implementing a method for dynamically scanning, filtering, and blocking harmful database queries that would otherwise consume significant resources and adversely impact overall system performance by utilizing the network environment of FIG. 2 is shown as being executed in FIG. 3. Specifically, a first client device 208(1) and a second client device 208(2) are illustrated as being in communication with DSG device 202. In this regard, the first client device 208(1) and the second client device 208(2) may be "clients" of the DSG device 202 and are described herein as such. Nevertheless, it is to be known and understood that the first client device 208(1) and/or the second client device 208(2) need not necessarily be "clients" of the DSG device 202, or any entity described in association therewith herein. Any additional or alternative relationship may exist between either or both of the first client device 208(1) and the second client device 208(2) and the DSG device 202, or no relationship may exist.

Further, DSG device 202 is illustrated as being able to access a historical data store access data repository 206(1) and a data store query rules database 206(2). The data store access gatekeeping module 302 may be configured to access these databases for implementing a method for dynamically scanning, filtering, and blocking harmful database queries that would otherwise consume significant resources and adversely impact overall system performance.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DSG device 202 via broadband or cellular communication. Of course, these embodiments are merely exemplary and are not limiting or exhaustive.

Upon being started, the data store access gatekeeping module 302 executes a process to dynamically scan, filter, and block harmful database queries that would otherwise consume significant resources and adversely impact overall system performance. An exemplary process for dynamically scanning, filtering, and blocking harmful database queries that would otherwise consume significant resources and adversely impact overall system performance is generally indicated at flowchart 400 in FIG. 4.

Figure 4:
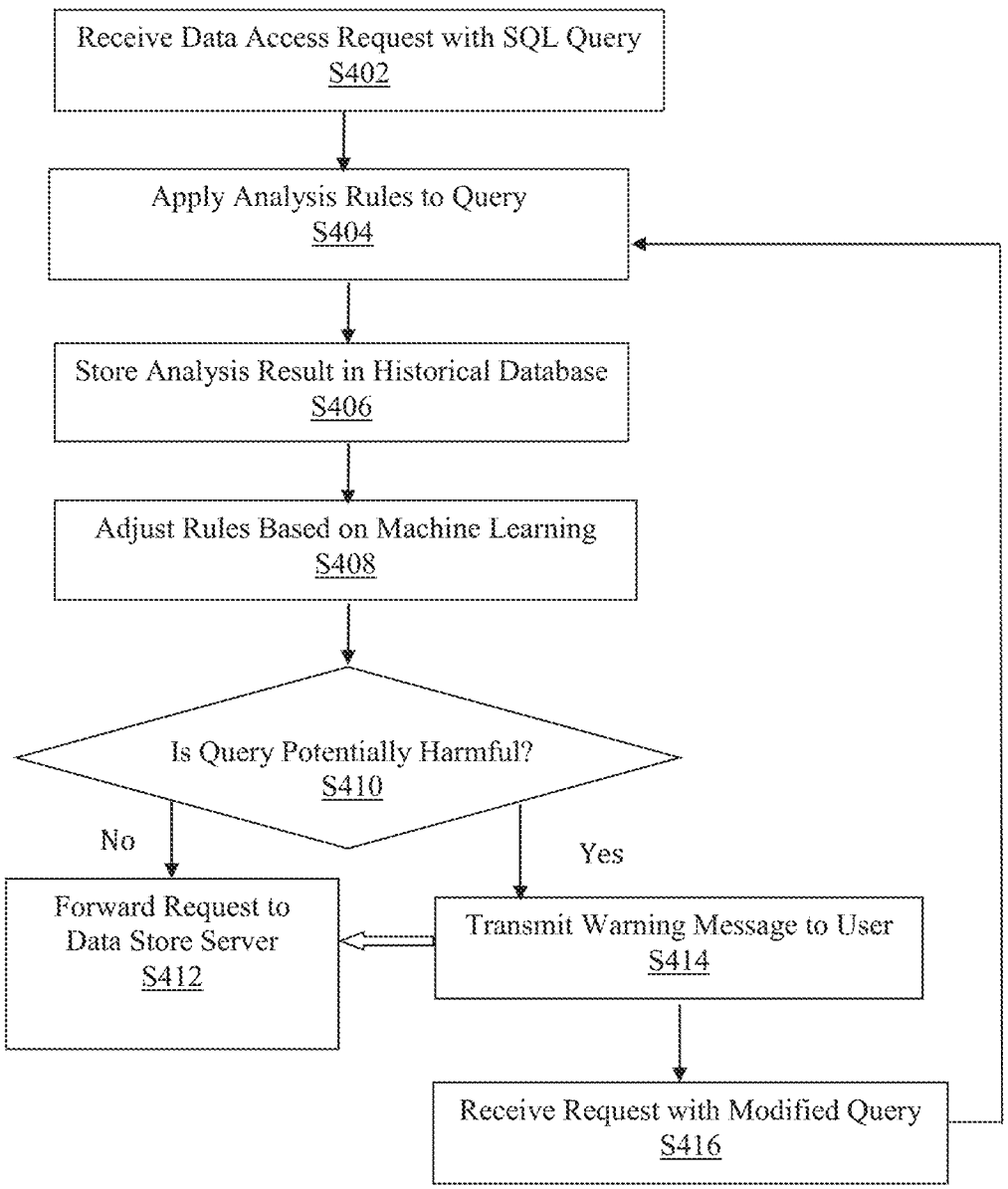
FIG. 4 is a flowchart of an exemplary process for implementing a method for dynamically scanning, filtering, and blocking harmful database queries that would otherwise consume significant resources and adversely impact overall system performance.

In the process 400 of FIG. 4, at step S402, the data store access gatekeeping module 302 receives, from a user or an application, a request for data that is accessible via a database, a data warehouse, or a data store. In an exemplary embodiment, the request for data includes a query, such as, for example, a Structured Query Language (SQL) query.

At step S404, the data store access gatekeeping module 302 analyzes the query to determine whether the query is potentially harmful. The analysis is performed by applying one or more rules to the query. In an exemplary embodiment, the rules may be configurable. For example, configurable settings may include any one or more of a number of joins allowed, a number of sub-selects allowed, and rules that relate to full outer joins. The rules may include a rule that relates to a maximum amount of memory to be consumed by granting the request for data and/or a rule that relates to a maximum amount of central processing unit (CPU) resources to be consumed by the granting the request for data. The rules may further include any other rule that is suitable for determining whether a query is potentially harmful to database and/or system resources.

At step S406, the data store access gatekeeping module 302 stores a result of the analysis in the historical database access data repository 206(1). Then, at step S408, the historical data stored in the repository 206(1) is used as an input to a machine learning algorithm to determine whether the rules should be adjusted, and if so, to adjust the rules based on an output of the machine learning algorithm. The newly stored data may also be used for training the machine learning algorithm for subsequent analyses.

At step S410, the data store access gatekeeping module 302 determines whether the query is potentially harmful. In an exemplary embodiment, the result of the analysis performed in step S404 and/or a result of an analysis based on the adjusted rules may be used to determine whether the query is potentially harmful.

When a determination is made that the query is not potentially harmful (i.e., result of step S410=No), then at step S412, the data store access gatekeeping module 302 forwards the request to a data store server 204(n) that is configured to fulfill the request by providing the desired data based on the query. In an exemplary embodiment, when a request is granted and a query is executed by providing the desired data, the data store access gatekeeping module 302 may implement a telemetry service that tracks metrics and metadata that relate to the execution of the query, and may store the metrics and metadata in the historical database access data repository 206(1).

When a determination is made that the query is potentially harmful (i.e., result of step S410=Yes), then at step S414, the data store access gatekeeping module 302 transmits a warning message to the user or the application from which the request originated. In an exemplary embodiment, the warning message may include information indicating that the request for data is denied and that the query is not to be executed, together with explanatory information indicating a reason for the denial of the request. For example, the explanatory information may include information about one or more rules applied to the query and a result of the analysis of the query from the application of those rules to the query.

In an alternative exemplary embodiment, the warning message may include explanatory information indicating a reason for the warning and a user reply request for prompting the user to respond to the warning. For example, the user reply request may ask the user to provide either a new request for data that includes a modified query or a user instruction to override the warning message and to grant the original request. In this manner, the user is given an opportunity to modify the query based on the explanatory information, or to proceed with the original query despite the warning.

As a result, the process 400 then proceeds either to step S412, at which the original request for data is forwarded to the server 204(1) as described above, or to step S416, at which a new request with a modified query is received. After the new request is received, the process returns to step S404 in order to apply the rules to the modified query and make a fresh determination as to whether the modified query is potentially harmful.

Figure 5:
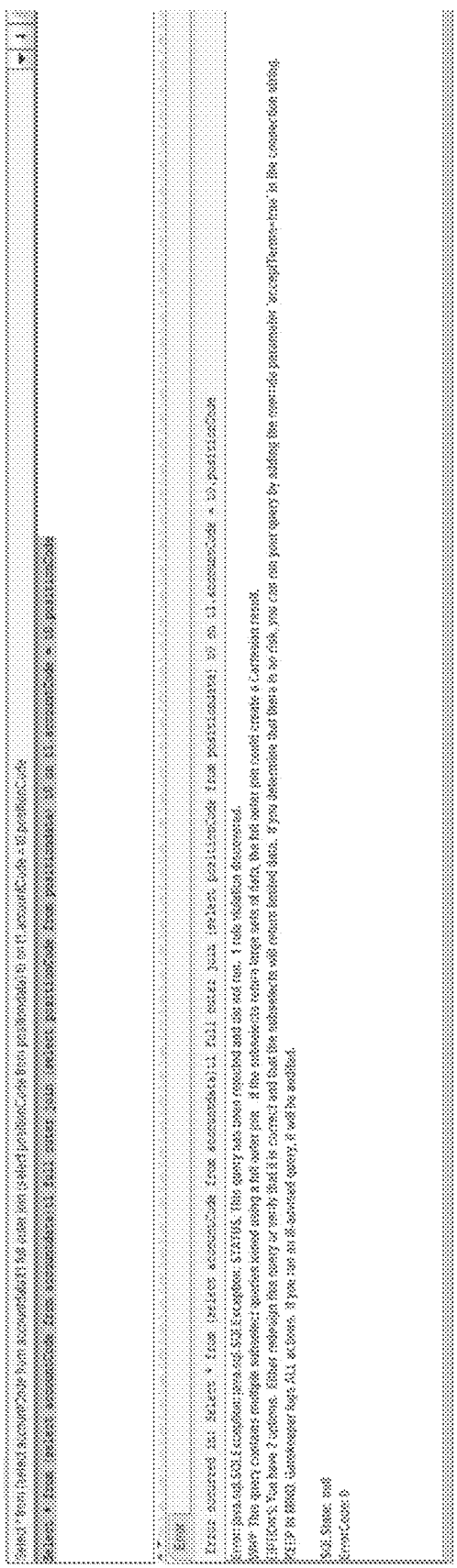
FIG. 5 is a first screenshot that illustrates a user interface that includes an error display in a result window that is provided in response to a user request for accessing data when the SQL query has been determined to be potentially harmful, in accordance with an exemplary embodiment.

Referring to FIG. 5, a first screenshot 500 of a user interface that includes an error display in a result window that is provided in response to a user request for accessing data when the SQL query has been determined to be potentially harmful is shown, in accordance with an exemplary embodiment. In the screenshot 500, the SQL query is displayed in the top portion of the screen, and the error message is displayed in the bottom portion of the screen. The error message indicates that the query "has been rejected and did not run" and "1 rule violation discovered". In addition, the error message includes an explanation that "This query contains multiple subselect queries joined using a full outer join" and that "If the subselects return large sets of data, the full outer join could create a Cartesian result." Finally, the error message notifies the user of two options for responding, including a first option of redesigning the query and a second option of overriding the error in order to execute the original query.

Figure 6:
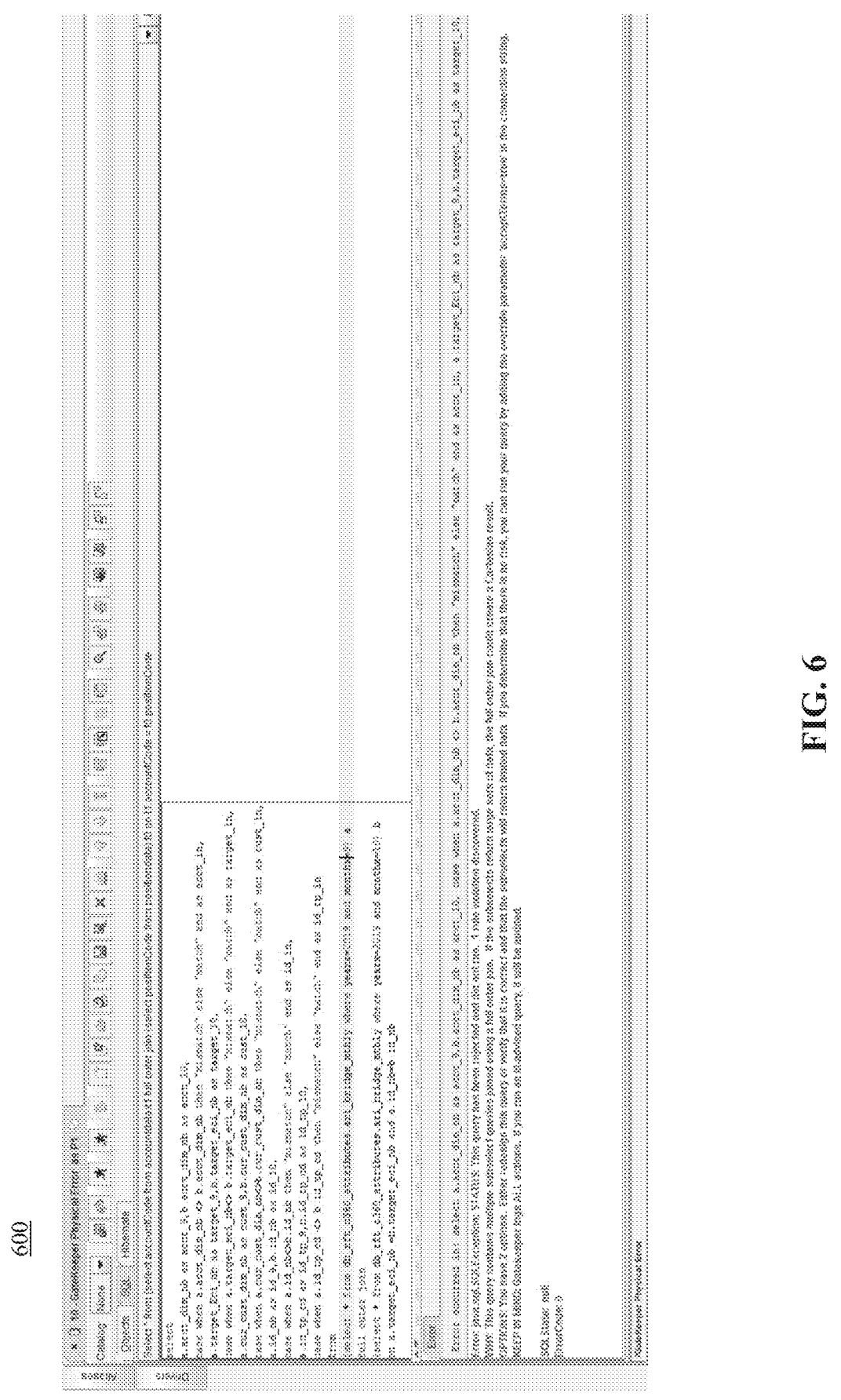

Referring to FIG. 6, a second screenshot 600 of a user interface that includes an error display in a result window that is provided in response to a user request for accessing data when the SQL query has been determined to be potentially harmful is shown, in accordance with an exemplary embodiment. In the screenshot 600, the SQL query is displayed in the top portion of the screen, and the error message is displayed in the bottom portion of the screen. The error message indicates that the query "has been rejected and did not run" and "1 rule violation discovered". In addition, the error message includes an explanation that "This query contains multiple subselect queries joined using a full outer join" and that "If the subselects return large sets of data, the full outer join could create a Cartesian result." Finally, the error message notifies the user of two options for responding, including a first option of redesigning the query and a second option of overriding the error in order to execute the original query.

Figure 7:
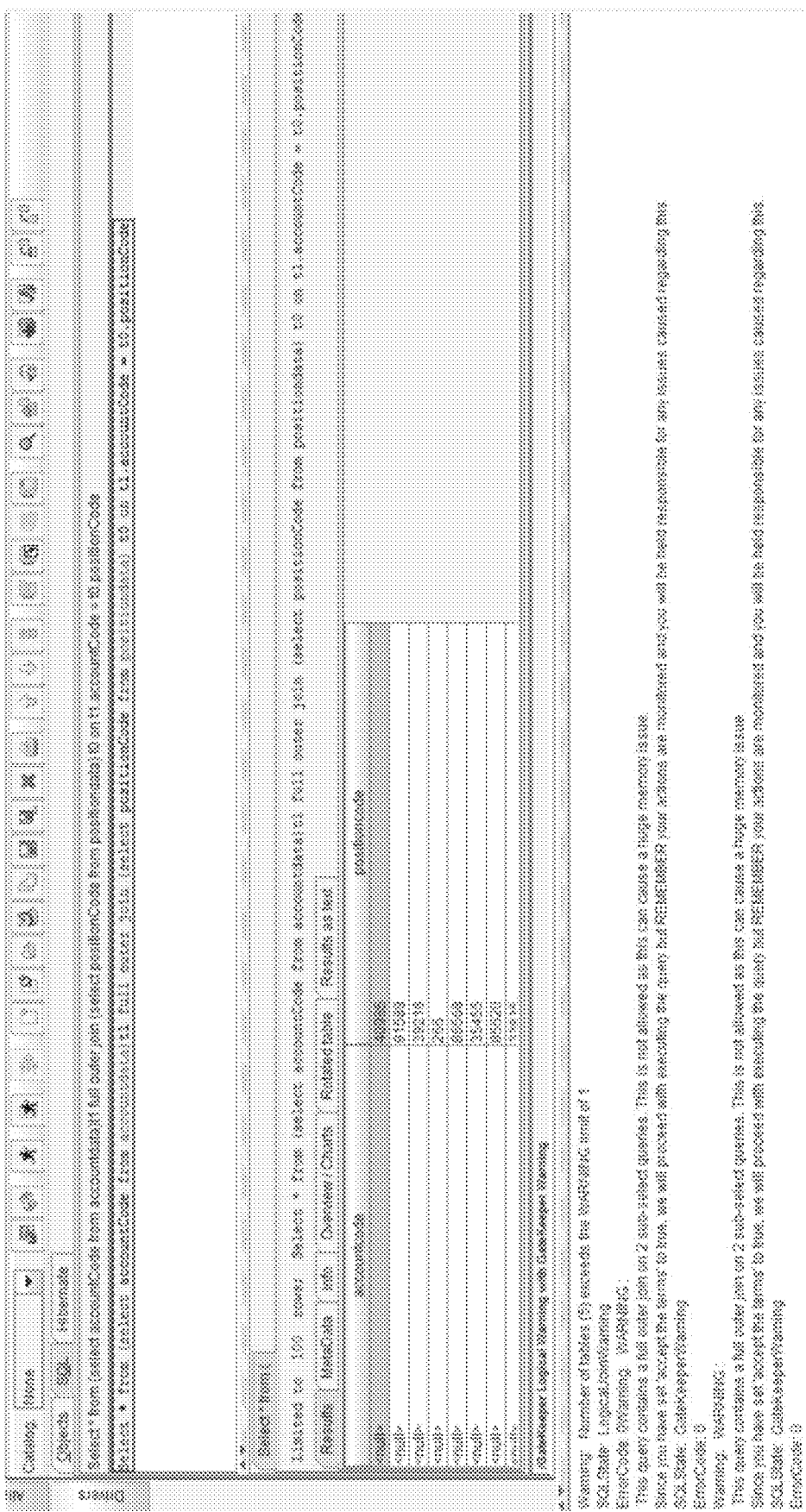
FIG. 7 is a third screenshot that illustrates a user interface that includes an warning in a result window that is provided in response to a user request for accessing data when the SQL query has been determined to be potentially harmful, in accordance with an exemplary embodiment.

Referring to FIG. 7, a third screenshot 700 that illustrates a user interface that includes an warning in a result window that is provided in response to a user request for accessing data when the SQL query has been determined to be potentially harmful is shown, in accordance with an exemplary embodiment. In the screenshot 700, the SQL query is displayed in the top portion of the screen, and the warning message is displayed in the bottom portion of the screen. The warning message indicates that the query "contains a full outer join on 2 sub-select queries" and that "This is not allowed as this can cause a huge memory issue." However, in this circumstance, the warning message notifies the user that "Since you have set 'accept the terms' to true, we will proceed with executing the query but REMEMBER your actions are monitored and you will be held responsible for any issues caused regarding this." Therefore, in the case of the warning message, the query may be executed instead of being blocked.

Accordingly, with this technology, an optimized process for implementing methods and systems for dynamically scanning, filtering, and blocking harmful database queries that would otherwise consume significant resources and adversely impact overall system performance is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for controlling access to a database, the method being implemented by at least one processor, the method comprising:
   receiving, from a user by the at least one processor, a first request for data that is accessible via the database, the first request including a first query;

analyzing, by the at least one processor, the first query to determine whether the first query is potentially harmful;

when the first query is determined as not potentially harmful, forwarding, by the at least one processor, the first request to a server configured to respond to the first request; and when the first query is determined as being potentially harmful, transmitting, to the user by the at least one processor, a warning message, wherein the analyzing of the first query includes an application of at least one rule to the first query, and the at least one rule includes at least one from among a first rule that relates to a number of Joins allowed, a second rule that relates to a number of sub-selects allowed, a third rule that relates to full outer joins, a fourth rule that relates to a maximum amount of memory to be consumed by granting the first request, and wherein the warning message includes information indicating that the first request is denied and that the first query is not to be executed, in conjunction with explanatory information indicating a reason for the denial of the first request, and wherein the explanatory information includes at least one from among information that relates to the application of the at least one rule to the first query and a result of the analyzing of the first query that relates to the application of the at least one rule to the first query.

2. The method of claim 1, wherein the analyzing comprises applying at least one database access rule to the first query.

3. The method of claim 2, wherein the at least one database access rule includes at least one from among a rule that relates to a maximum amount of memory to be consumed by granting the first request and a rule that relates to a maximum amount of central processing unit (CPU) resources to be consumed by granting the first request.

4. The method of claim 3, further comprising storing a result of the analyzing in a historical database access data repository.

5. The method of claim 4, wherein the analyzing further comprises using at least one machine learning technique for determining whether the first query is potentially harmful.

6. The method of claim 5, wherein the using at least one machine learning technique comprises using the first query and data stored in the historical database access data repository as inputs to a predetermined machine learning algorithm and determining whether the first query is potentially harmful based on an output of the predetermined machine learning algorithm.

7. The method of claim 5, wherein the using at least one machine learning technique comprises:
using the data stored in the historical database access data repository as an input to a predetermined machine learning algorithm;
modifying the at least one database access rule based on an output of the predetermined machine learning algorithm; and
determining whether the first query is potentially harmful based on the modified at least one database access rule.

8. The method of claim 1, wherein the warning message further includes explanatory information indicating a reason for the warning message and a user reply request for prompting the user to provide at least one from among a second request that includes a second query and a third request that includes a user instruction to override the warning message and to grant the first request.

9. The method of claim 1, wherein the first query includes a Structured Query Language (SQL) query.

10. A computing apparatus for controlling access to a database, the computing apparatus comprising:
a processor;
a memory; and
a communication interface coupled to each of the processor and the memory,
wherein the processor is configured to:
receive, from a user via the communication interface, a first request for data that is accessible via the database, the first request including a first query;
analyze the first query to detemline whether the first query is potentially harmful;
when the first query is determined as not potentially harmful, forward, via the communication interface, the first request to a server configured to respond to the first request; and
when the first query is determined as being potentially harmful, transmit, to the user via the communication interface, a warning message,
wherein the analysis of the first query includes an application of at least one rule to the first query, and the at least one rule includes at least one from among a first rule that relates to a number of joins allowed, a second rule that relates to a number of sub-selects allowed, a third rule that relates to full outer joins, and a fourth rule that relates to a maximum amount of memory to be consumed by granting the first request, and
wherein the warning message includes information indicating that the first request is denied and that the first query is not to be executed, in conjunction with explanatory information indicating a reason for the denial of the first request, and
wherein the explanatory information includes at least one from among information that relates to the application of the at least one rule to the first query and a result of the analyzing fo the first query that relates to the application of the at least one rule to the first query.

11. The computing apparatus of claim 10, wherein the processor is further configured to analyze the first query by applying at least one database access rule to the first query.

12. The computing apparatus of claim 11, wherein the at least one database access rule includes at least one from among a rule that relates to a maximum amount of memory to be consumed by granting the first request and a rule that relates to a maximum amount of central processing unit (CPU) resources to be consumed by granting the first request.

13. The computing apparatus of claim 12, wherein the processor is further configured to store a result of the analysis in a historical database access data repository.

14. The computing apparatus of claim 13, wherein the processor is further configured to analyze the first query by using at least one machine learning technique for determining whether the first query is potentially harmful.

15. The computing apparatus of claim 14, wherein the processor is further configured to use the first query and data stored in the historical database access data repository as inputs to a predetermined machine learning algorithm and to determine whether the first query is potentially harmful based on an output of the predetermined machine learning algorithm.

16. The computing apparatus of claim 14, wherein the processor is further configured to:
    use the data stored in the historical database access data repository as an input to a predetermined machine learning algorithm;
    modify the at least one database access rule based on an output of the predetermined machine learning algorithm; and
    determine whether the first query is potentially harmful based on the modified at least one database access rule.

17. The computing apparatus of claim 10, wherein the warning message further includes explanatory information indicating a reason for the warning message and a user reply request for prompting the user to provide at least one from among a second request that includes a second query and a third request that includes a user instruction to override the warning message and to grant the first request.

18. The computing apparatus of claim 10, wherein the first query includes a Structured Query Language (SQL) query.

* * * * *